United States Patent [19]
Barber et al.

[11] Patent Number: 5,242,120
[45] Date of Patent: Sep. 7, 1993

[54] MULTI COMPONENT FERTILIZER SUPPLY SYSTEM FOR A MOBILE SPREADER

[76] Inventors: Larry Barber; James Barber, both of 1404 N. Regal, Spokane, Wash. 99202

[21] Appl. No.: 804,099

[22] Filed: Dec. 6, 1991

[51] Int. Cl.$^5$ ............................................. A01C 15/04
[52] U.S. Cl. ................................. 239/656; 239/655; 239/662; 239/675; 239/676
[58] Field of Search ............................. 239/654–656, 239/662, 672, 673, 675, 676; 366/177, 186, 20, 168, 181; 222/145, 135

[56] References Cited

U.S. PATENT DOCUMENTS

| | | | |
|---|---|---|---|
| 986,553 | 3/1911 | Derby | 366/181 |
| 1,293,034 | 2/1919 | Chambers | 366/181 |
| 4,296,695 | 10/1981 | Quanbeck | 239/654 |
| 5,052,627 | 10/1991 | Balmer | 239/656 |

FOREIGN PATENT DOCUMENTS

| | | | |
|---|---|---|---|
| 0936841 | 6/1982 | U.S.S.R. | 239/675 |
| 85/03407 | 8/1985 | World Int. Prop. O. | 239/675 |

*Primary Examiner*—Andres Kashnikow
*Assistant Examiner*—Karen B. Merritt
*Attorney, Agent, or Firm*—Wells, St. John, Roberts, Gregory & Matkin

[57] ABSTRACT

A distribution system for agricultural chemicals includes a primary auger conveyor that delivers particulates from a common hopper structure. The hopper is provided with primary and secondary particulate compartments. Primary particulate compartment discharges into a first auger conveyor. When a mixture of two particulate components is desired, the second component can be discharged from the secondary hopper compartment by operation of a second conveyor leading to the first. Liquid stored on-board the supporting vehicle can also be discharged into the main auger conveyor to wet the particulates prior to their delivery.

3 Claims, 2 Drawing Sheets

MULTI COMPONENT FERTILIZER SUPPLY SYSTEM FOR A MOBILE SPREADER

TECHNICAL FIELD

This disclosure relates to delivery systems for field application of chemical particulates, such as fertilizer. It is specifically directed to a novel conveying and mixing system for delivering two or more particulate chemicals, whether dry or wetted, to a particulate distribution system.

BACKGROUND OF THE INVENTION

Chemicals, fertilizers and other particulates (in powder or granular form) are commonly applied to agricultural fields by a particulate distribution system that typically includes transverse spreading assemblies overlapping a swath across the field during each pass of the equipment. The particulate distribution system can be mounted on any form of land vehicle, such as a trailer, truck or specially designed self-propelled vehicle. Normally such vehicles will carry a particulates storage hopper, a transverse distributor for spreading the particulates, and a conveyor for moving particulates from within the hopper to the distributor. Because uniformity is necessary to effective spreading of chemical particulates about a field, a metering system for measuring and allocating flow of particulates spread onto the field is either included within the distribution system or is interposed between the conveyor outlet and the receiving distribution system.

One form of distribution system for spreading of particulates is a relatively simple spinner. One or more rotating spinners fling particulates onto the field surface as the material is dropped onto the spinners by a delivery mechanism or conveyor.

Mechanical delivery of particulates has been accurately achieved by mounting a transverse spreader hopper across a vehicle and providing a system of baffles, apertures, agitators and/or augers along its length. One example of such system is shown in U.S. Pat. No. 3,259,278, issued Jul. 5, 1966. A later improvement in such systems is disclosed in U.S. Pat. No. 3,680,741, issued Aug. 1, 1972. As illustrated in both patents, increased width across the distribution system was achieved by utilizing foldable hoppers that can either be arranged at the sides of a vehicle for distributing particulates at positions alongside the vehicle for transport purposes.

More recently, field application systems have been introduced which use pneumatic distribution tubes to carry particulates outwardly to each side of a vehicle. These systems are illustrated by the equipment shown in U.S. Pat. Nos. 4,462,550 and 4,964,575. In these systems, metering of incoming particulates between vertical chutes leading to the tubes is achieved by mechanically flinging the particulate material by a centrifugal deflector. Other metering systems that have been commercially used in such systems involve metering rollers, star wheels and conveyor chains.

This disclosure is applicable to any form of particulate distribution system where it is desired to apply at least two types of particulates in a uniform mixture. Such mixtures cannot always be premixed prior to delivery to the mobile spreading assembly, since vibrations and discharge of the particulates might result in stratification. Furthermore, many users (farmers) do not have equipment readily available for accurately mixing dry materials, with or without wetting, and the accuracy of pre-mixing components deteriorates as the ratio of one component to another increases. It is also desirable for the user to be able to vary the ratios of the components to match field conditions encountered at the time of application.

The desired mixtures might include two types of particulates or one or two particulates plus a liquid. The particulates and/or liquids might include fertilizers, pesticides, herbicides and other agricultural chemicals used for treating soil, growing crops and/or insects. Because the present equipment is designed for distribution of particulate solid materials, the active ingredients must be in the form of granular or wetted granular materials that can be accurately metered and conveyed by use of augers. The present system permits the user to selectively choose from two forms of particulates and a liquid wetting agent to arrive at the composition of the granular materials distributed onto the field. The apparatus assures uniform and controllable introduction of each component into the distribution system.

BRIEF DESCRIPTION OF THE DRAWINGS

Preferred embodiments of the invention are described below with reference to the accompanying drawings, which are briefly described below.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
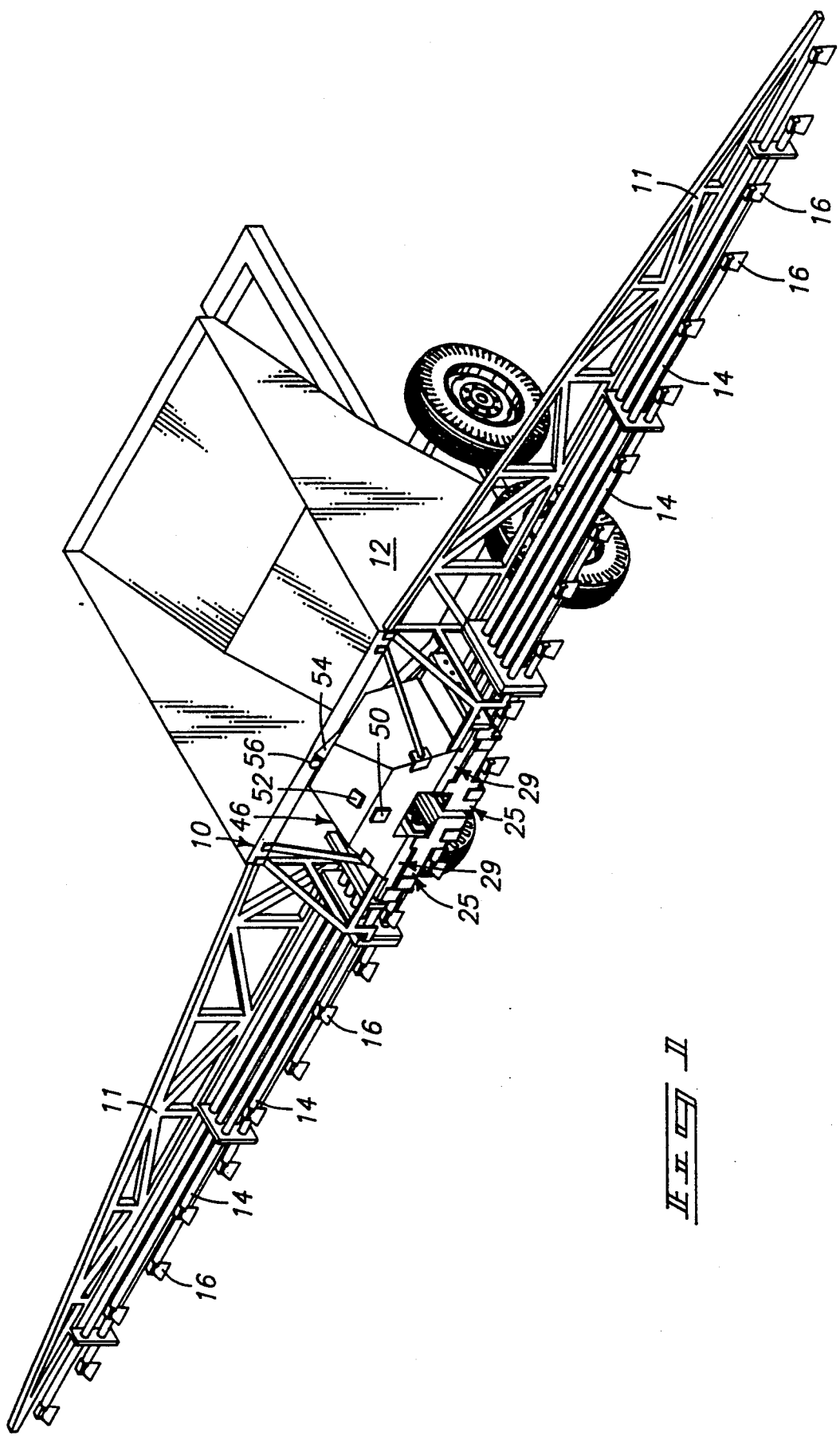
FIG. 1 is a perspective view of a vehicle-mounted air distribution system for field application of particulates.

The present improvement is illustrated as part of an air distribution system for agricultural chemicals supplied in a granular form, whether dry or wetted. The general features of such a distribution system are illustrated in FIG. 1. It is to be understood that this improvement is applicable to other forms of particulate distribution systems and is not to be limited to air systems as shown in the supporting example.

As shown in FIG. 1, the air distribution system is mounted to a wheel-supported vehicle frame 10. The frame 10 supports a relatively large storage hopper assembly 12 for the particulates.

The air distribution apparatus utilizes a plurality of elongated delivery tubes 14. When designed for discharge of particulates across a wide swath, the delivery tubes 14 are typically supported on hinged wings or booms 11 that can be folded alongside the vehicle frame 10 for transport purposes. The wings or booms 11 are hinged to the vehicle frame for folding purposes, but details of this feature have been omitted from this disclosure because they are well-known and not vital to an understanding of the present invention.

Each delivery tube 14 has longitudinally spaced inboard and outboard sections for respectively receiving and discharging particulates. Their outboard sections, which are transversely spaced from one another in a repetitive sequence across the width of the apparatus, are provided with angular deflectors 16. Deflectors 16 are adapted to project the particulates in a relatively uniform distribution pattern across the field area under the delivery tubes.

In the illustrated embodiment, the delivery tubes 14 are vertically stacked in two horizontal layers. Paired delivery tubes 14 in the two horizontal layers are vertically aligned with one another. While not essential to the practice of the invention, the stacking of the layered tubes reduces the overall width of the tube assembly by a factor of two.

The inboard sections of each tube are structurally supported within a delivery tube housing 25 that includes air manifold chambers extending across each layer of delivery tubes 14. Nozzles (not shown) interposed between the air manifold chamber and the respective layers of delivery tubes 14 provide air jets at the inner ends of each delivery tube 14 to convey particulates to their outer ends, where the particulates are discharged at deflector 16.

Incoming particulates are proportioned amoung the individual delivery tubes 14 by two metering assemblies contained within metering housings 29. Each metering housing 29 includes individual augers that feed particulates to vertical chutes leading to the interiors of the respective delivery tubes 14. The augers in turn are provided with a constant supply of particulates stored within a bifurcated receiving hopper 46 maintained with a supply of particulates between a lower control sensor 50 and an upper control sensor 52.

Particulates are directed into the receiving hopper 46 by means of a primary supply auger 54 powered by a motor 56. The bifurcated receiving hopper 46 includes a pair of gravitational discharges leading to the respective metering housings 29 and located above the distribution stations where particulates are introduced into the respective delivery tubes 14 at each side of the equivalent.

Figure 2:
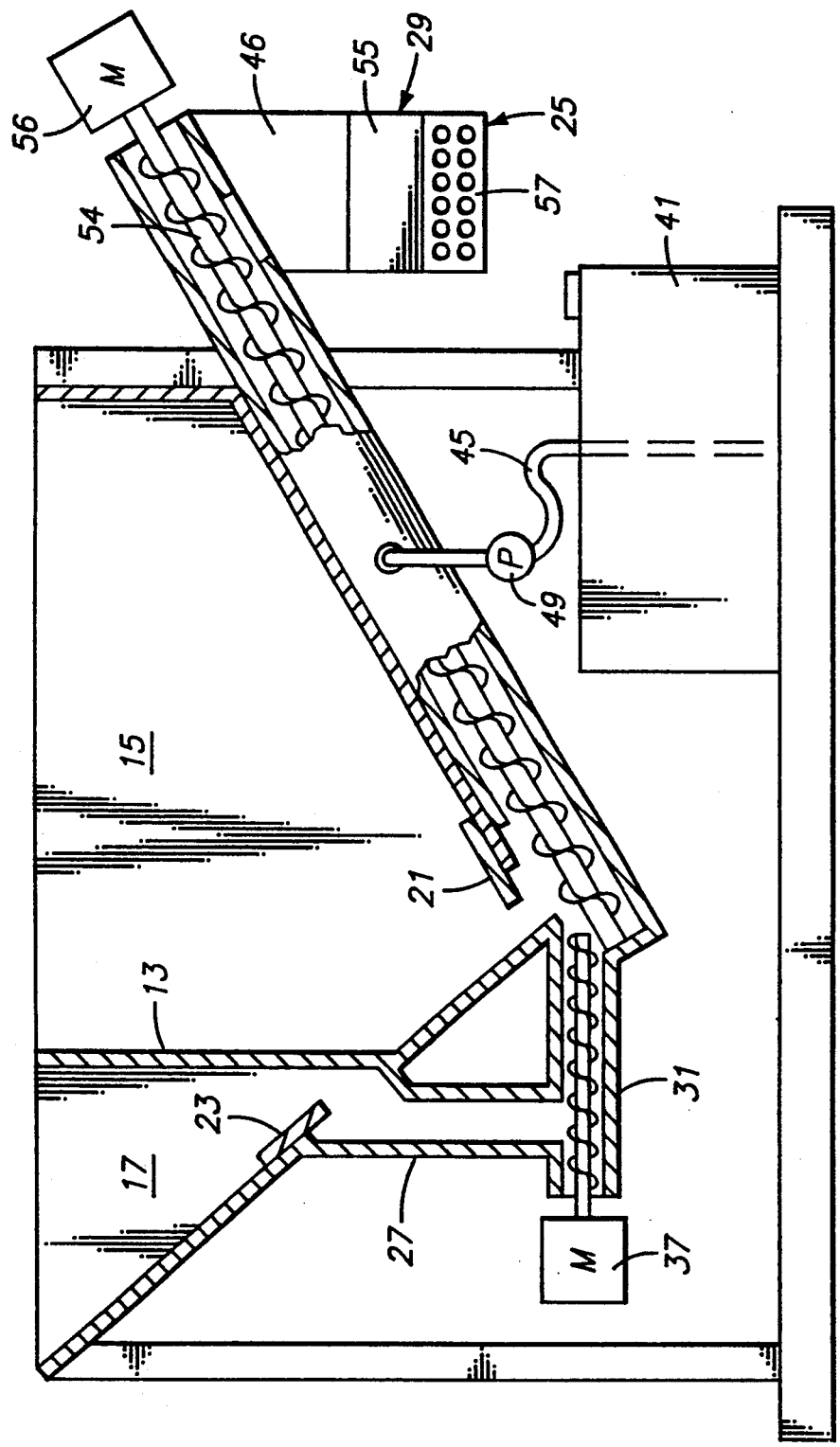
FIG. 2 is a schematic view illustrating the general features of the present improvement.

Referring to the schematic diagram shown in FIG. 2, it can be seen that the hopper assembly 12 is divided into two compartments by a transverse wall 13. This forms a primary hopper 15 and a secondary hopper 17. The lower end of primary hopper 15 includes a controllable discharge gate 21 leading to the interior of the supply auger 54.

In FIG. 2, the equipment within the metering housings 29, which shall be broadly termed "metering means," is generally illustrated at 55. The components contained within the delivery tube housing 25, including the inboard ends of delivery tubes 14, are generally represented in FIG. 2 by the reference numeral 57.

The secondary hopper compartment 17 is provided with a controllable discharge gate 23 at its lower end. The opening of gate 23 leads to a vertical chute 27 in open communication with a secondary auger conveyor 31. The discharge of conveyor 31 intersects the interior of the supply auger conveyor 54 at its lower or inlet end. Thus, any particulates delivered to the interior of auger conveyor 54 by the secondary conveyor 31 will be mixed with particulates from the hopper 15 as the materials are pushed upwardly along the inclined conveyor housing by rotation of the interior auger.

The secondary auger conveyor 31 is shown as being powered by a separate motor 37. It is to be understood that conveyor 31 can be proportionally driven from the shaft of primary auger conveyor 54, or can be alternately powered by an independently controllable motor (as shown).

This improvement also makes possible the wetting of granular materials within the primary auger conveyor 54. Liquid stored on the vehicle frame 10 within a reservoir or tank 41 is supplied through a conduit 45 and a pump 49. The conduit 45 opens into the interior of the primary auger conveyor 54 at a location downstream from the introduction of particulates. Suitable injection nozzles can be utilized to spray liquid onto the moving granular materials prior to their discharge into receiving hopper 46.

The illustrated equipment provides substantial versatility to a distribution system for granular agricultural products. Uniform and constant proportional delivery of particulates is available from the primary and secondary hopper compartments 15, 17. Similarly controllable amounts of liquid can be added to wet the particulates prior to their discharge into the pneumatic delivery tubes. The driving motors 56, 37 and the pump 49 can all be operated in proportion to vehicle speed in order to provide application of chemicals to covered acreage regardless of vehicle speed at any given time.

In compliance with the statute, the invention has been described in language more or less specific as to methodical features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. An apparatus for field application of particulates, comprising:

a pair of delivery tube assemblies extending to opposite sides of a supporting vehicle, each assembly including a plurality of delivery tubes having an inboard section positioned at a central distribution station on the vehicle;

a storage hopper assembly on the vehicle, the storage hopper assembly being divided into a primary hopper and a secondary hopper;

a bifurcated receiving hopper on the vehicle, the receiving hopper including a pair of gravitational discharges located above the distribution station;

a primary conveyor leading from the primary hopper to the receiving hopper for maintaining a predetermined level of particulates within the gravitational discharges of the receiving hopper;

metering means interposed between the discharge of the receiving hopper and the delivery tubes for directing a predetermined flow of particulates into each delivery tube; and a secondary conveyor leading from the secondary hopper and intersecting the primary conveyor for directing particulates from the secondary hopper to the primary conveyor.

2. The apparatus of claim 1, further comprising: tank means for storing liquids on the vehicle; and conduit means for introducing liquid from the tank means to the primary conveyor.

3. The apparatus of claim 2, wherein the conduit means extends from the tank means to the primary conveyor at a location that is downstream from the intersection of the primary and secondary conveyors.

* * * * *